United States Patent [19]
Massie

[11] 3,714,228
[45] Jan. 30, 1973

[54] PREPARATION OF ESTERS

[75] Inventor: Stephen N. Massie, Palatine, Ill.

[73] Assignee: Universal Oil Products Company, Des Plaines, Ill.

[22] Filed: Aug. 14, 1970

[21] Appl. No.: 70,620

[52] U.S. Cl. ......260/476 R, 260/326.14, 260/326.3, 260/410.5, 260/410.9 R, 260/468 R, 260/471 A, 260/479 R, 260/479 S, 260/482 R, 260/486 R, 260/488 CD, 260/488 F

[51] Int. Cl. ....C07c 69/14, C07c 69/54, C07c 69/78

[58] Field of Search ........260/476 R, 486 R, 488 CD; 252/472

[56] References Cited

UNITED STATES PATENTS

| | | | |
|---|---|---|---|
| 1,908,708 | 5/1933 | Krchma et al. | 260/488 |
| 3,534,088 | 10/1970 | Bryant et al. | 260/476 |

*Primary Examiner*—Lorraine A. Weinberger
*Assistant Examiner*—R. S. Weissberg
*Attorney*—James R. Hoatson, Jr. and Raymond H. Nelson

[57] ABSTRACT

The esterification of carboxylic acids with carbinols is effected in the presence of a catalyst comprising a palladium salt or palladium complex at esterification conditions. The reaction is exemplified by the reaction of benzoic acid with benzyl alcohol in the presence of palladium acetate to produce benzyl benzoate.

9 Claims, No Drawings

PREPARATION OF ESTERS

This invention relates to a process for producing esters, and more particularly to a process for reacting a carboxylic acid with a carbinol in the presence of certain catalytic compositions of matter of the type hereinafter set forth in greater detail. The use of esters in the chemical field is well known. For example, benzyl acetate is used as an essential ingredient of artificial jasmin and other flowery perfumes, in soap perfumes, in some flavors, in natural and synthetic resins, oils, lacquers, etc.; benzyl benzoate is used as a fixative and solvent for musk in perfumes and flavors, in medicines, as a plasticizer; benzyl propionate is also used in perfumes; methyl methacrylate is used in polymers and co-polymers; ethyl acrylate is used in polymers, acrylic paints and as a chemical intermediate; ethyl acetate is used as a lacquer and plastic solvent, in flavoring, perfumery, artificial fruit essences, as a smokeless powder etc. In addition, the esters resulting from the use of an amino acid such as alanine, glycine, etc., are used in medicines, in biochemical research, resins, etc.

It is therefore an object of this invention to provide a process for obtaining esters.

A further object of this invention is to provide a process for reacting a carboxylic acid and a carbinol utilizing certain catalytic compositions of matter.

In one aspect an embodiment of this invention resides in a process for the preparation of an ester which comprises reacting a carboxylic acid with an alcohol in the presence of a palladium-containing catalyst at esterification conditions, and recovering the resultant ester.

A specific embodiment of this invention is found in a process for the preparation of an ester which comprises reacting benzoic acid with benzyl alcohol in the presence of a catalyst comprising palladium acetylacetonate at a temperature in the range of from about 100° to about 250° C. and a pressure in the range of from about atmospheric to about 100 atmospheres and recovering the resultant benzyl benzoate.

Other objects and embodiments will be found in the following further detailed description of the present invention.

As hereinbefore set forth the present invention in concerned with a process for preparing esters by reacting a carboxylic acid with a carbinol in the presence of certain catalytic compositions of matter as the type hereinafter set forth in greater detail. By utilizing the catalytic compositions of matter of the present invention, it is possible to effect the esterification reaction under neutral conditions, no acid being present. This will be of particular advantage when esterifying certain compounds which possess a delicate structure which is particularly sensitive to acids and which may be destroyed to some extent during the esterification reaction thus resulting in a loss of the ultimate yield of the desired product. In addition, it also will permit a single step esterification process when esterifying these compounds inasmuch as those compounds which possess a delicate structure do not have to be protected. When such compounds are subjected to an esterification reaction utilizing acidic conditions, it is necessary, in many instances, to protect the structure in such a way so that an intermediate step is required, thus necessitating a more involved and intricate process with a corresponding increase in the cost of the final product. However, by utilizing the catalytic compositions of matter of the present process, it is possible, as hereinbefore set forth, to effect the esterification reaction in a single step with a corresponding increase in yield of the desired product.

The esterification conditions under which the reaction of the present process is effected will include elevated temperatures in a range of from about 100° up to about 250° C. or more and at a pressure in the range of from atmospheric up to about 100 atmospheres or more. The amount of pressure which is utilized to effect the reaction will be dependent upon the particular reactants which are undergoing esterification as well as the temperature at which the reaction is effected, the amount of pressure which is used being that which is necessary to maintain the major portion of the reactants in the liquid phase. In the event that superatmospheric pressures are employed, said pressures are provided for by the introduction of a substantially inert gas such as nitrogen into the reaction vessel. In addition, the residence time which is required to effect the reaction will range from about 0.5 up to about 20 hours or more in duration, said reaction time also being dependent upon the particular reactants which are employed as well as the operating conditions of temperature and pressure which are used.

Examples of carboxylic acids which are utilized as one of the starting materials in the esterification process of the present invention will include aliphatic acids, amino acids, cycloaliphatic acids, aromatic acids, etc. Some representative examples of these acids which may be employed include aliphatic acids, both saturated and unsaturated in nature, containing from two to about 20 carbon atoms in length such as acetic acid, propionic acid, butyric acid, valeric acid, caproic acid, enanthylic acid, caprylic acid, pelargonic acid, capric acid, undecylic acid, lauric acid, tridecoic acid, myristic acid, pentadecanoic acid, palmitic acid, margaric acid, stearic acid, nondecylic acid, arachidic acid, etc,; unsaturated aliphatic acids such as acrylic acid, crotonic acid, isocrotonic acid, vinyl acetic acid, methylacrylic acid, tiglic acid, angelic acid, senesioic acid, the isomeric hexenic acids, heptenic acids, octenic acids, etc.; amino substituted aliphatic acids such as glycine, alanine, alaine, norvaline, leucine, norleucine, isoleucine, isovaline, phenylalanine, tyrosine, serine, proline, tryptophane, hydroxyproline, arginine, lysine, ornithine, asparagine, citrulline, etc.; cycloaliphatic acids such as cyclopentanecarboxylic acid, cyclohexanecarboxylic acid, cycloheptanecarboxylic acid, etc.; aromatic acids such as benzoic acid, o-toluic acid, m-toluic acid, p-toluic acid, alpha-phenylacetic acid, beta-phenylpropionic acid, gamma-phenylbutyric acid, etc.

Examples of carbinols both saturated and unsaturated, which are utilized as the other reactants in the process of this invention include aliphatic alcohols such as methyl alcohol, ethyl alcohol, propyl alcohol, isopropyl alcohol, n-butyl alcohol, sec-butyl alcohol, tert-butyl alcohol, the isomeric amyl, hexyl, heptyl, octyl, nonyl, decyl, undecyl, dodecyl, tridecyl, tetradecyl, pentadecyl, hexadecyl, heptadecyl, octadecyl, nonadecyl, eicosene alcohols, etc.; cycloaliphatic alcohols such as cyclopentanol, cyclohexanol, cycloheptanol, etc.; aromatic alcohols such as phenol benzyl alcohol, occresol, m-cresol, p-cresol, the xylenols, mesitol, 2-phenylethanol, 3-phenylpropanol, 4-phenylbutanol, 5-phenylpentanol, etc. It is to be understood that the aforementioned carboxylic acids and carbinols are only representative of the class of compounds which may be used, and that the present invention is not necessarily limited thereto.

The reaction between the aforementioned carboxylic acids and carbinols is effected in the presence of a catalytic composition of matter which comprises a palladium containing compound, the salts or complexes of palladium being utilized therefor. Some representative examples of palladium containing compounds which act as catalysts for the ester reaction include inorganic palladium salts such as palladium chloride, palladium bromide, palladium iodide, palladium nitrate, palladium sulfate, palladium phosphate, etc.; organic palladium containing compounds such as palladium acetate, palladium acetylacetonate, palladium propionate, palladium butyrate, etc.; or complexes such as an allylpalladium chloride dimer, dichlorobis(trimethylphosphine) (trimethylphosphine) palladium(II), etc. It is contemplated within the scope of this invention that salts or complexes of other noble metals of Group VIII of the Periodic Table may also be utilized as catalysts for the esterification reaction, although not necessarily with equivalent results. Some examples of these noble metal salts or complexes will include platinum chloride, osmium chloride, ruthenium chloride, rhodium chloride, platinum bromide, osmium bromide, ruthenium bromide, rhodium bromide, platinum iodide, osmium iodide, ruthenium iodide, rhodium iodide, platinum nitrate, osmium nitrate, ruthenium nitrate, rhodium nitrate, platinum acetate, osmium acetate, ruthenium acetate, rhodium acetate, platinum acetyl-acetonate, osmium acetylacetonate, ruthenium acetylacetonate, rhodium acetylacetonate, etc. In the preferred embodiment of the invention the catalyst which is utilized is that which is soluble in the solvent which is utilized, said solvent including aromatic compounds such as benzene, toluene, o-xylene, m-xylene, p-xylene, ethylbenzene, etc. As hereinbefore set forth this is preferred inasmuch as the reaction may be effected in a single phase.

The process of this invention may be effected in any suitable manner and may comprise a batch or continuous type operation. For example, when a batch type operation is used a quantity of the carboxylic acid and the carbinol is placed in an appropriate apparatus along with the palladium containing catalyst and, if so desired, an organic solvent of the type hereinbefore set forth. The reaction apparatus may comprise a flask provided with heating and stirring means or an autoclave of the rotating or the mixing type if superatmospheric pressures are to be employed. In the event that superatmospheric pressures are used, the autoclave is sealed and an inert gas such as nitrogen is pressured in until the desired operating pressure has been reached. Following this, the reaction apparatus is then heated to the desired operating temperature and maintained thereat for a predetermined residence time in the range also hereinbefore set forth. Upon completion of the desired reaction time, heating is discontinued and the apparatus allowed to return to room temperature. Any excess pressure which may be present is discharged, the apparatus is opened and the reaction mixture is recovered. The mixture is then subjected to conventional means of separation including fractional distillation whereby the desired ester is separated and recovered from any unreacted starting materials, side products, catalysts and solvent.

It is contemplated within the scope of this invention that the process may be effected in a continuous manner of operation. When such a type of operation is utilized, the starting materials comprising a carboxylic acid and a carbinol are continuously charged to the reaction zone which is maintained at the proper operating conditions of temperature and pressure. In addition, the catalyst and solvent are also continuously charged to the zone through a separate line, if so desired, the catalyst-solvent solution may be admixed with one or both of the starting materials prior to entry into said reactor and charged thereto. Upon completion of the desired reaction time, the reactor effluent is continuously withdrawn and subjected to separation steps whereby the desired ester is separated and recovered, the unreacted starting materials, catalyst, and solvent being recycled to the reaction zone to form a portion of the feed stock.

Some representative examples of esters which may be prepared according to the process of this invention will include methyl acrylate, methyl methacrylate, methyl crotonate, ethyl acrylate, ethyl methacrylate, ethyl crotonate, propyl acrylate, propyl methacrylate, propyl crotonate, ethyl acetate, ethyl propionate, ethyl butyrate, ethyl valerate, propyl acetate, propyl propionate, propyl butyrate, methyl benzoate, ethyl benzoate, propyl benzoate, benzyl acetate, benzyl propionate, benzyl butyrate, benzyl valerate, benzyl acrylate, benzyl methacrylate, benzyl crotonate, benzyl benzoate, etc.

The following examples are given to illustrate the process of the present invention which, however, are not intended to limit the generally broad scope of the present invention in strict accordance therewith.

EXAMPLE I

In this example 3.1 g. of benzoic acid, 0.6 g. of benzyl alcohol and 50 g. of toluene were placed in the glass liner of a rotating autoclave along with 1.0 g. of palladium acetylacetonate. The autoclave was sealed and nitrogen pressed in until an initial operating pressure of 35 atmospheres was reached. The autoclave was then heated to a temperature of 180° C. and maintained thereat for a period of 16 hours. At the end of this time, heating was discontinued and the autoclave allowed to return to room temperature. After the autoclave had returned to room temperature, the excess pressure was discharged, the autoclave was opened and the reaction mixture was recovered. The mixture which comprises a red-amber liquid was extracted with caustic to remove the excess benzoic acid. The caustic-soluble matter was dried by using anhydrous potassium carbonate and subjected to quantative gas-liquid chromatographic analysis which disclosed the presence of benzyl benzoate, no benzyl alcohol remaining unreacted.

EXAMPLE II

In this example 60.0 g. of acetic acid and 30.0 g. of benzyl alcohol along with 1.0 g. of a catalyst comprising palladium acetate and 40.0 g. of benzene are placed in the glass liner of a rotating autoclave which is thereafter sealed. Nitrogen is then pressed in until an initial pressure of 30 atmospheres is reached and thereafter the autoclave is heated to a temperature of 175° C. After maintaining this temperature for a period of 16 hours, heating is discontinued and the autoclave is allowed to return to room temperature. After returning to room temperature, the excess pressure is discharged, the autoclave is opened and the reaction mixture is recovered. After treatment in a manner similar to that set forth in Example I above, a gas-liquid chromatographic analysis will verify that the product is the desired benzyl acetate.

EXAMPLE III

In like manner, 44.0 g. of butyric acid and 54.0 g. of benzyl alcohol are reacted in the presence of a catalyst comprising palladium chloride, said reaction conditions including a temperature of 175° C., a pressure of 30 atmospheres of nitrogen and a reaction time of 16 hours. After discontinuation of the heating, discharge of the excess pressure and recovery of the reaction mixture, the desired product comprising benzyl butyrate is recovered.

EXAMPLE IV

In this example 72.0 g. of acrylic acid and 88.0 g. of anhydrous ethyl alcohol along with 1.0 g. of palladium acetyl-acetonate and 200.0 g. of benzene are placed in the glass liner of a rotating autoclave. The liner is then sealed into the autoclave, flushed with nitrogen and nitrogen pressed in until an initial pressure of 30 atmospheres is reached. The autoclave is then heated to a temperature of 120° C. and maintained thereat for a period of 16 hours. At the end of this time period, heating is discontinued, the autoclave is allowed to return to room temperature and excess pressure is discharged. The autoclave is opened and the reaction mixture is recovered therefrom following which the mixture is treated with aqueous caustic to remove any excess unreacted acrylic acid. After drying, the mixture is subjected to gas-liquid chromatographic analysis which will verify the fact that the desired product, commonly named ethyl acrylate, is prepared.

EXAMPLE V

A mixture consisting of 160.0 g. of methyl alcohol, 86.0 g. of methylacrylic acid and 1.0 g. of palladium acetate and 200.0 g. of benzene is placed in the glass liner of a rotating autoclave which is thereafter sealed into the autoclave. After a sufficient amount of nitrogen is pressed in so that an initial operating pressure of 30 atmospheres is reached, the autoclave and contents thereof are then heated to a temperature of 180°C. and maintained thereat for a reaction time which is of 16 hours duration. At the end of 16 hours, heating is discontinued, the autoclave is allowed to return to room temperature and the excess pressure is discharged. After recovering the reaction mixture, it is treated in a manner similar to that hereinbefore set forth whereby the desired product comprising methyl acrylate is separated and recovered.

I claim as my invention:

1. A process for the preparation of an ester which comprises reacting a carboxylic acid with an alcohol in the presence of a palladium salt or complex at a temperature in the range of from about 100° to about 250° C. and a pressure in the range of from about atmospheric to about 100 atmospheres, and recovering the resultant ester.

2. The process as set forth in claim 1 in which said palladium salt or complex is palladium acetate.

3. The process as set forth in claim 1 in which said palladium salt or complex is palladium chloride.

4. The process as set forth in claim 1 in which said palladium salt or complex is palladium acetylacetonate.

5. The process as set forth in claim 1 in which said carboxylic acid is benzoic acid, said alcohol is benzyl alcohol and said ester is benzyl benzoate.

6. The process as set forth in claim 1 in which said carboxylic acid is acetic acid, said alcohol is benzyl alcohol and said ester is benzyl acetate.

7. The process as set forth in claim 1 in which said carboxylic acid is butyric acid, said alcohol is benzyl alcohol and said ester is benzyl butyrate.

8. The process as set forth in claim 1 in which said carboxylic acid is acrylic acid, said alcohol is ethyl alcohol and said ester is ethyl acrylate.

9. The process as set forth in claim 1 in which said carboxylic acid is methacrylic acid, said alcohol is methyl alcohol and said ester is methyl methacrylate.

* * * * *